US012777199B2

(12) United States Patent
Edwards et al.

(10) Patent No.: US 12,777,199 B2
(45) Date of Patent: Oct. 27, 2026

(54) PROGRESSIVE CODING FOR AUTOENCODERS

(71) Applicant: Synaptics Incorporated, San Jose, CA (US)

(72) Inventors: Isaac R. Edwards, London (GB); Scott Liam Ransom, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 36 days.

(21) Appl. No.: 18/799,408

(22) Filed: Aug. 9, 2024

(65) Prior Publication Data

US 2026/0046460 A1 Feb. 12, 2026

(51) Int. Cl.
*H04N 19/91* (2014.01)
*H04N 19/164* (2014.01)
*H04N 19/42* (2014.01)

(52) U.S. Cl.
CPC ........... *H04N 19/91* (2014.11); *H04N 19/164* (2014.11); *H04N 19/42* (2014.11)

(58) Field of Classification Search
CPC ....... H04N 19/91; H04N 19/164; H04N 19/42
See application file for complete search history.

(56) References Cited

U.S. PATENT DOCUMENTS 10,332,001 B2 6/2019 Rippel et al.
2018/0269969 A1* 9/2018 Lee ...................... H04B 17/336
2023/0336742 A1* 10/2023 Han ....................... H04N 19/30
2024/0205432 A1* 6/2024 Di .......................... H04N 19/30
2025/0254366 A1* 8/2025 Nguyen ............... H04N 19/119

FOREIGN PATENT DOCUMENTS

WO 2022159897 A1 7/2022

OTHER PUBLICATIONS

Balle, "Variational Image Compression with a Scale Hyperprior," arXiv:1802.01436v2 [eess.IV], May 1, 2018, pp. 1-23.
Birla, "Basics of Autoencoders," Medium, pp. 1-8, Mar. 12, 2019, https://medium.com/@birla.deepak26/autoencoders-76bb49ae6a8f.
Hojjat et al., "ProgDTD: Progressive Learned Image Compression with Double-Tail-Drop Training," in arXiv:2305.02145v2 [cs.CV], Apr. 30, 2024, pp. 1-10.

(Continued)

*Primary Examiner* — Richard T Torrente
(74) *Attorney, Agent, or Firm* — Paradice & Li LLP

(57) ABSTRACT

This disclosure provides methods, devices, and systems for image encoding. The present implementations more specifically relate to progressive encoding techniques for autoencoders. In some aspects, an image encoder may encode an image as a tensor of latent attributes having multiple channels based on one or more first layers of a neural network model, and recombine the tensor channels, in a prioritized order, based on one or more second layers of the neural network model. The image encoder may progressively transmit the recombined tensor channels over a communication channel based on the prioritized order. In some implementations, the image encoder may transmit the recombined tensor channels, in order of priority, so that channels assigned higher priorities are transmitted before channels assigned lower priorities.

18 Claims, 8 Drawing Sheets

(56) References Cited

OTHER PUBLICATIONS

Lee et al., "DPICT: Deep Progressive Image Compression Using Trit-Planes," arXiv:2112.06334v2 [eess.IV], May 6, 2022, pp. 1-10.
Hojjat Ali et al: "LimitNet: Progressive, Content-Aware Image Offloading for Extremely Weak Devices & Networks", Proceedings of the 17th ACM Conference on Security and Privacy in Wireless and Mobile Networks, ACMPUB27, New York, NY, USA, Jun. 3, 2024 (Jun. 3, 2024), pp. 519-533, XP059733339, DOI: 10.1145/3643832.3661856, ISBN: 979-8-4007-0583-0.
European Search Report dated Dec. 4, 2025, from EP Application No. 25194552.

* cited by examiner

PROGRESSIVE CODING FOR AUTOENCODERS

TECHNICAL FIELD

The present implementations relate generally to image encoding, and specifically to progressive coding for autoencoders.

BACKGROUND OF RELATED ART

A digital image can be any pattern of light that is reproduceable on a digital display. For example, a digital image can be represented by an array of pixel values (or multiple arrays of pixel values associated with different channels) that describe the color and intensity of light to be emitted by each pixel of a display. Some display devices may receive digital images, over a communication channel (such as a wired or wireless medium), from a source device (such as an image capture device or image data repository). Due to bandwidth limitations of the communication channel, digital image data is often encoded and/or compressed prior to transmission by the source device. Data compression is a technique for encoding information into smaller units of data. As such, data compression can be used to reduce the bandwidth or overhead needed to store or transmit digital images over the communication channel.

Some modern image encoding systems (such as autoencoders) use machine learning to achieve greater levels of data compression. In existing autoencoder architectures, an image decoder (implementing a decoding portion of an autoencoder) must receive all of the compressed image data from an image encoder (implementing an encoding portion of the autoencoder) in order to reconstruct the image. However, varying conditions on the communication channel (such as changes in available bandwidth) can cause data to be dropped or otherwise not transmitted by the image encoder. Thus, new image compression techniques are needed to adapt to varying channel conditions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method encoding images. The method includes steps of encoding an image as a tensor of latent attributes having a plurality of first channels based on one or more first layers of a neural network model; recombining the plurality of first channels, as a plurality of second channels having a prioritized order, based on one or more second layers of the neural network model; and progressively transmitting the plurality of second channels over a communication channel based on the prioritized order.

Another innovative aspect of the subject matter of this disclosure can be implemented in an encoder that includes a processing system and a memory. The memory stores instructions that, when executed by the processing system, cause the encoder to encode an image as a tensor of latent attributes having a plurality of first channels based on one or more first layers of a neural network model; recombine the plurality of first channels, as a plurality of second channels having a prioritized order, based on one or more second layers of the neural network model; and progressively transmit the plurality of second channels over a communication channel based on the prioritized order.

BRIEF DESCRIPTION OF THE DRAWINGS

The present implementations are illustrated by way of example and are not intended to be limited by the figures of the accompanying drawings.

DETAILED DESCRIPTION

Figure 1:
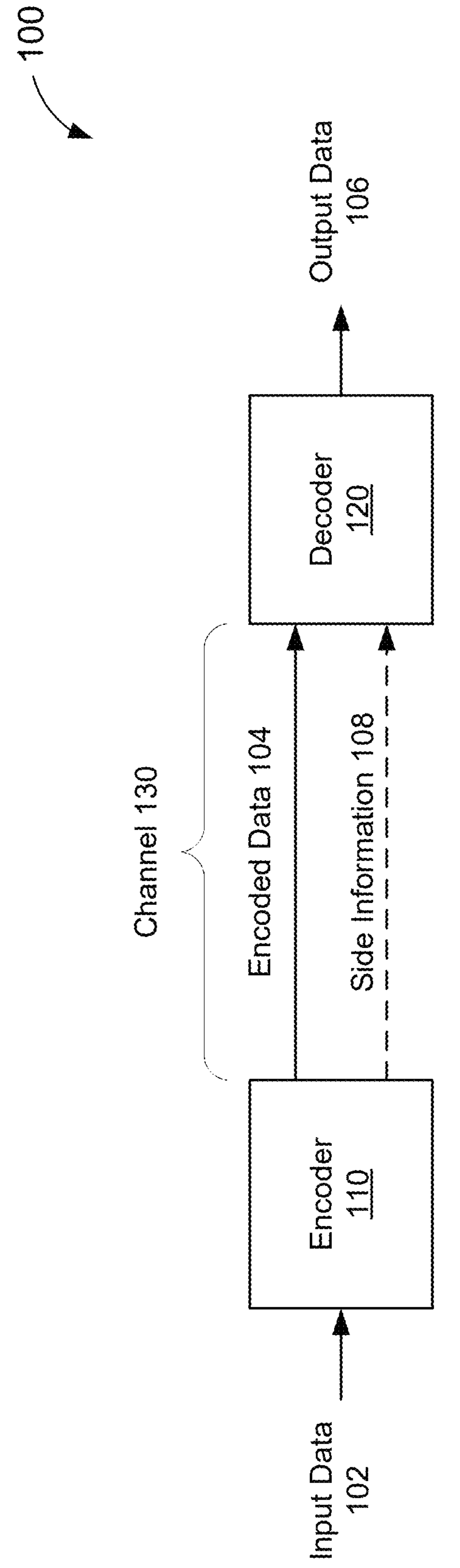
FIG. 1 shows a block diagram of an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, some modern image encoding systems (such as autoencoders) utilize machine learning to achieve greater levels of data compression. Machine learning is a technique for improving the ability of a computer system or application to perform a specific task. During a training phase, a machine learning system is provided with multiple "answers" and a large volume of raw input data. The machine learning system analyzes the input data to learn a set of rules (also referred to as the "machine learning model") that can be used to map the input data to the answers. During an inferencing phase, the machine learning system uses the trained machine learning model to infer answers from new input data.

Deep learning is a particular form of machine learning in which the inferencing and training phases are performed over multiple layers. Deep learning architectures are often referred to as "artificial neural networks" due to the manner in which information is processed (similar to a biological nervous system). For example, each layer of an artificial neural network may be composed of one or more "neurons." Each layer of neurons may perform a different transformation on the output data from a preceding layer so that the final output of the neural network results in the desired inferences. The set of transformations associated with the various layers of the network is referred to as a "neural network model."

An autoencoder is a type of artificial neural network that is well suited for image compression. For example, an autoencoder can be trained to reproduce, at its output, the same image received at its input. A bottleneck is imposed between the input layer and the output layer of the neural network, which reduces a dimensionality of the outputs at the intermediate layers. As a result of the bottleneck, the autoencoder is forced to learn a compressed representation of the input image (also referred to as the "latent attributes" of the image). Thus, autoencoder architectures generally include an image encoder trained to convert a digital image into a lower-dimensional tensor or vector of latent attributes, and an image decoder trained to reconstruct the original image from the tensor or vector of latent attributes.

The latent attributes represent the compressed image data sent by the image encoder, over a communication channel, to the image decoder. For example, the image encoder may implement the encoding portion of an autoencoder, and the image decoder may implement the decoding portion of the autoencoder. In existing autoencoder architectures, the image decoder must receive all of the compressed image data from the image encoder in order to reconstruct the image. However, varying conditions on the communication channel (such as changes in available bandwidth) can cause data to be dropped or otherwise not transmitted by the image encoder. Aspects of the present disclosure recognize that autoencoders can adapt the compression of image data to changes in channel conditions by progressively encoding the channels of a tensor based on their contribution to image quality.

Various aspects relate generally to image compression, and more particularly, to progressive encoding techniques for autoencoders. As used herein, the term "progressive encoding" refers to various techniques for generating compressed image data (such as a tensor of latent attributes) that allow the original image to be reconstructed, at different quality levels, from different amounts of compressed data. In some aspects, an image encoder may encode an image as a tensor of latent attributes having multiple channels, based on one or more first layers of a neural network model, and recombine the tensor channels, in a prioritized order, based on one or more second layers of the neural network model. The image encoder may progressively transmit the recombined tensor channels over a communication channel based on the prioritized order. In some implementations, the image encoder may transmit the recombined tensor channels, in order of priority, so that channels having higher priorities are transmitted before channels having lower priorities.

Particular implementations of the subject matter described in this disclosure can be implemented to realize one or more of the following potential advantages. By progressively encoding digital images, aspects of the present disclosure can adapt the compression of image data to changes in channel conditions (such as due to bandwidth limitations). For example, tensor channels that are more important to the reconstruction of an image may be prioritized for transmission over tensor channels that are less important to the reconstruction of the image. Thus, when the available bandwidth on the communication channel falls below a threshold level, the image encoder can terminate or cut off the transmission of the tensor before all of the channels have been transmitted. Because the highest-priority channels are transmitted first, the image decoder can still reconstruct the image (at a lower quality level) using only the subset of channels that were transmitted by the image encoder.

FIG. 1 shows a block diagram of an example communication system 100 for encoding and decoding data. The communication system 100 includes an encoder 110 and a decoder 120. In some implementations, the encoder 110 and decoder 120 may be provided in respective communication devices such as, for example, computers, switches, routers, hubs, gateways, cameras, displays, or other devices capable of transmitting or receiving communication signals. In some other implementations, the encoder 110 and decoder 120 may be included in the same device or system.

The encoder 110 receives input data 102 to be transmitted or stored via a channel 130. For example, the channel 130 may include a wired or wireless communication medium that facilitates communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130, as encoded data 104. The decoder 120 is configured to receive the encoded data 104, via the channel 130, and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As a result, the output data 106 may be different than the input data 102. Example lossy compression techniques include, among other examples, transform coding (such as through application of a spatial-frequency transform) and quantization (such as through application of a quantization matrix). In contrast, lossless data compression does not result in any loss of information between the encoding and decoding steps as long as the channel 130 does not introduce errors into the encoded data 104. As a result, the output data 106 is identical to the input data 102. Example lossless compression techniques include, among other examples, entropy encoding (such as arithmetic coding, Huffman coding, or Golomb coding) and run-length encoding (RLE).

Entropy coding is a form of lossless data compression that encodes data values (or "symbols") into codewords of varying lengths based on the probability of occurrence of each data symbol. For example, data symbols that have a higher probability of occurrence may be encoded into shorter codewords than data symbols that have a lower probability of occurrence. To support decoding of entropy-coded data, the encoder 110 may transmit side information 108 to the decoder 120. The side information 108 indicates the entropy model used for encoding the input data 102 (such as the probability of occurrence of each data symbol). Thus, the decoder 120 may use the side information 108 to recover the output data 106 from the encoded data 104.

In some implementations, the encoder 110 and the decoder 120 may utilize machine learning to achieve even greater data compression. As described above, machine learning is a technique for improving the ability of a computer system or application to perform a specific task. During a training phase, a machine learning system is provided with multiple "answers" and a large volume of raw input data. The machine learning system analyzes the input data to learn a set of rules that can be used to map the input data to the answers. During an inferencing phase, the machine learning system uses the trained machine learning model to infer answers from new input data. Deep learning is a particular form of machine learning in which the inferencing and training phases are performed over multiple layers of neurons (also referred to as an "artificial neural network"). Each layer of neurons may perform a different transformation on the output data from a preceding layer so that the final output of the neural network results in the desired inferences.

An autoencoder is a type of artificial neural network that is well suited for image compression. For example, an autoencoder can be trained to reproduce, at its output, the same image received at its input. A bottleneck is imposed between the input layer and the output layer of the neural network, which reduces the dimensionality of the outputs at intermediate layers. As a result of the bottleneck, the autoencoder is forced to learn a compressed representation of the input image (also referred to as the "latent attributes" of the image). Thus, autoencoder architectures generally include an encoder trained to convert a frame of image data into a lower-dimensional tensor or vector of latent attributes, and a decoder trained to reconstruct the original frame of image data from the tensor or vector of latent attributes.

Figure 2:
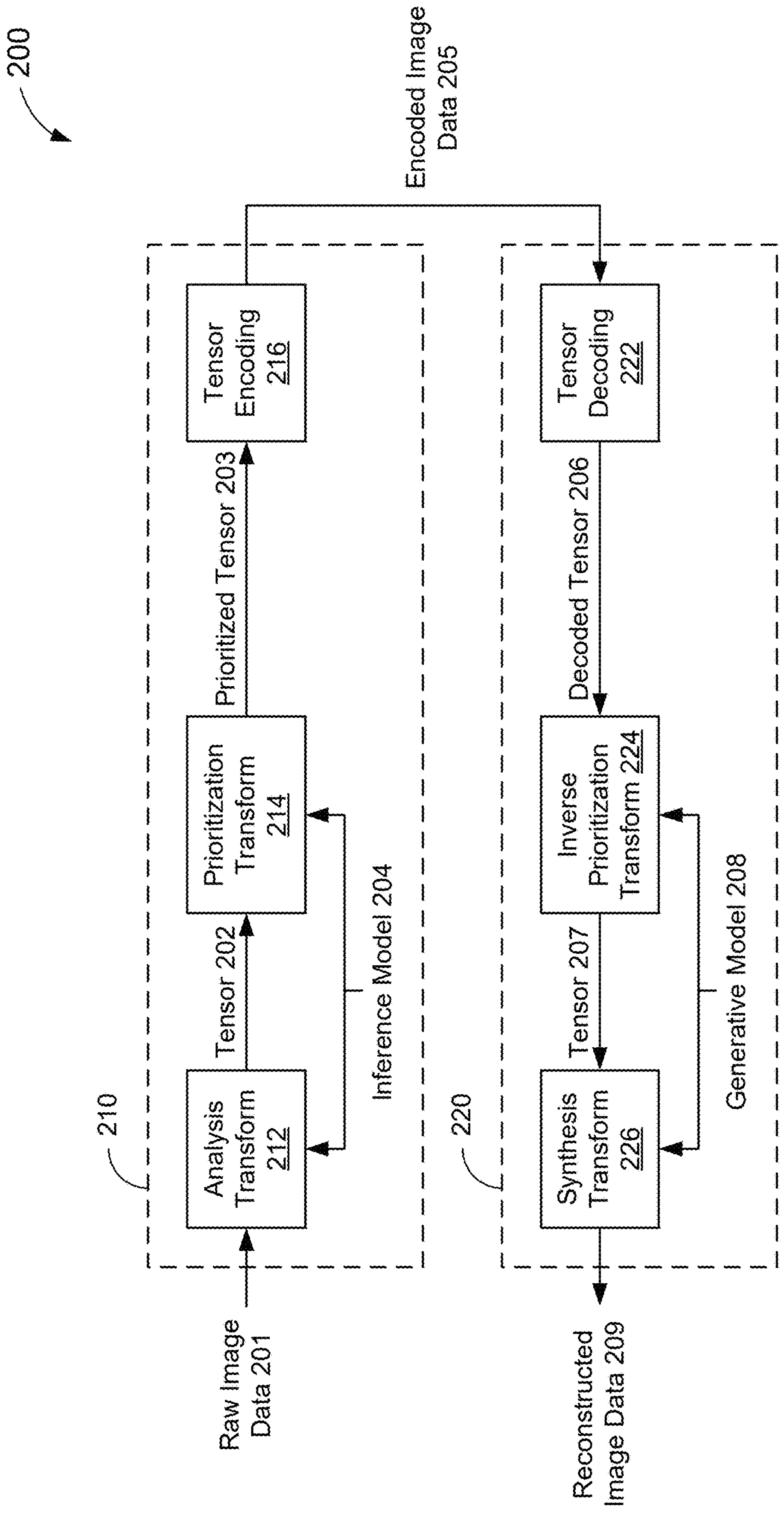
FIG. 2 shows a block diagram of an example image encoding and decoding system, according to some implementations.

FIG. 2 shows a block diagram of an example image encoding and decoding system 200, according to some implementations. The system 200 includes an image encoder 210 and an image decoder 220. In some implementations, the image encoder 210 and the image decoder 220 may be examples of the encoder 110 and decoder 120, respectively, of FIG. 1. Thus, the image encoder 210 may be communicatively coupled to the image decoder 220 via a communication channel (such as the channel 130 of FIG. 1).

The image encoder 210 is configured to encode raw image data 201, as encoded image data 205, for transmission to the image decoder 220. For example, a frame of raw image data 201 may include an array of pixel values (or multiple arrays of pixel values associated with different color channels) representing a digital image or frame of video captured or acquired by an image source (such as a camera or other image output device). In some aspects, the image encoder 210 may transmit a sequence of frames of encoded image data 205 each representing a respective frame of a digital video.

The image decoder 220 is configured to decode the encoded image data 205, as reconstructed image data 209, for display on a display device (such as a television, computer monitor, smartphone, or other device that includes an electronic display). More specifically, the image decoder 220 may reverse the encoding performed by the image encoder 210 so that the reconstructed image data 209 is substantially similar to the raw image data 201. In some aspects, the image decoder 220 may display or render a sequence of frames of reconstructed image data 209 on the display device.

The image encoder 210 is shown to include an analysis transform 212, a prioritization transform 214, and a tensor encoding component 216. The analysis transform 212 transforms the raw image data 201 into a tensor 202 of latent attributes based on a neural network model 204. In some implementations, the neural network model 204 may perform an encoding operation associated with an autoencoder trained to reduce the dimensionality of the raw image data 201. Thus, the neural network model 204 also may be referred to as the "inference model" of the autoencoder. As a result, the tensor 202 may be a compressed representation of the raw image data 201.

In some implementations, the analysis transform 212 may include multiple layers of a convolutional neural network (CNN) trained to reduce the dimensionality of the raw image data 201. For example, the raw image data 201 may be represented by a three-dimensional (3D) array of pixel values having a particular height ($h_i$), width ($w_i$), and depth ($d_i$). The CNN produces the tensor 202, at its output, as a result of processing the raw image data 201 through various convolutional layers, pooling layers, or any combination thereof, that reduce the dimensionality of the raw image data 201. For example, the resulting tensor 202 may be a 3D array (h, w, d) having a height h, width w, and depth d, where $h<h_i$, $w<w_i$, and $d>d_i$. The depth d of the tensor 202 is defined as the number of "channels" having dimensions h×w.

Aspects of the present disclosure recognize that some tensor channels contribute more heavily to the reconstruction of an image than other tensor channels. Aspects of the present disclosure also recognize that an image can be reconstructed from only a subset of tensor channels having the greatest influence on image quality. For example, a threshold number (n) of channels may be needed to reconstruct an image at a minimum acceptable level of image quality (where $n<d$). The image quality can be progressively improved by adding tensor channels to the reconstruction (also referred to as "progressive encoding"). To support progressive encoding, the image encoder must have knowledge about the contribution of each tensor channel to image quality and/or reconstruction. However, existing autoencoders are not trained to prioritize certain tensor channels over others.

In some aspects, the prioritization transform 214 is configured to transform the channels of the tensor 202, to produce a prioritized tensor 203, so that each channel of the prioritized tensor 203 is assigned a priority based on a contribution of the channel to a quality level of the image. For example, the prioritization transform 214 may assign a higher priority to tensor channels that contribute more to image quality and may assign a lower priority to tensor channels that contribute less to image quality. In some implementations, the prioritization transform 214 may arrange (or rearrange) the channels of the tensor 202 in order of priority so that the highest-priority tensor channel(s) can be encoded and/or transmitted, as a bitstream, before the lowest-priority tensor channel(s). In such implementations, each channel of the prioritized tensor 203 may be the same as a respective channel of the tensor 202.

In some other implementations, the channels of the tensor 202 may be recombined through one or more layers of the inference model 204 to produce new tensor channels, having a prioritized order, for the prioritized tensor 203. For example, the inference model 204 may include two or more densely connected layers that are trained to produce prioritized channels based on a contribution of each prioritized channel to a quality level of an image. The dense layers may be connected to output layers of the analysis transform 212 so that the inputs of the dense layers coincide with the outputs of the analysis transform 212 and the outputs of the dense layers result in the prioritized channels. More specifically, the densely connected layers may modify the channels and/or data of the tensor 202 so that the prioritized channels can be progressively encoded and/or transmitted to achieve various levels of image quality. As a result, one or more channels of the prioritized tensor 203 may be different than any channel of the tensor 202.

In some implementations, the dense layers of the inference model 204 may be trained to minimize the following loss function over a number (N) of different quality levels ($\lambda_n$):

$$\text{Loss} = \sum_{n=0}^{N} s_n\left(\lambda_n^{-1} \cdot bpp_n + \text{distortion}_n\right) \tag{1}$$

where the learned parameters include the bits per pixel ($bpp_n$) needed for the compressed representation of the image (also referred to as the "encoding rate") and the amount of distortion in the resulting image ($\text{distortion}_n$), which can be measured according to any suitable metric. As shown in Equation 1, each quality level $\lambda_n$ sets the ratio between encoding rate and image distortion for the loss function, where $s_n$ is a scalar constant that can be used to prioritize lower or higher qualities in training. More specifically, the quality metric $\lambda_n$ is applied to the encoding rate, rather than distortion, and is therefore denoted as an inverse term $$(\lambda_n^{-1}).$$

The tensor encoding component 216 is configured to encode the prioritized tensor 203 as one or more codewords, of the encoded image data 205, according to one or more coding schemes. In some implementations, the tensor encoding component 216 may perform entropy encoding (or other lossless or lossy compression) on the prioritized tensor 203 to further reduce the amount of encoded image data 205 transmitted to the image decoder 220. In some implementations, the encoded image data 206 may include side information, in addition to the encoded tensor, indicating the entropy model used by the tensor encoding component 216 to encode the prioritized tensor 203 (such as described with reference to FIG. 1).

In some aspects, the tensor encoding component 216 may encode and transmit each channel of the prioritized tensor 203, in order of priority, so that the channel(s) assigned the highest priority (by the prioritization transform 214) is encoded and/or transmitted before the channel(s) assigned the lowest priority. For example, the tensor encoding component 216 may encode the channels of the prioritized tensor 203, as a bitstream, according to the order in which the channels are arranged and/or output by the prioritization transform 214. In some aspects, the tensor encoding component 216 may dynamically terminate or cut off the bitstream before all channels of the prioritized tensor 203 have been transmitted and/or encoded.

In some implementations, the tensor encoding component 216 may terminate the bitstream when the amount of encoded image data 205 transmitted over a communication channel exceeds an available bandwidth of the communication channel. For example, under low-bandwidth channel conditions, the tensor encoding component 216 may encode and/or transmit only a subset of highest-priority channels of the prioritized tensor 203 while dropping or discarding the remaining lower-priority channels. In some other implementations, the tensor encoding component 216 may encode and/or transmit only a threshold number of channels of the prioritized tensor 203 associated with a desired image quality. For example, the tensor encoding component 216 may terminate the bitstream after encoding and/or transmitting enough tensor channels to achieve the desired image quality.

In some implementations, the percentage of tensor channels dropped by the tensor encoding component 216 may be associated with a particular quality level $\lambda_n$. For example, the percentage of tensor channels dropped by the tensor encoding component 216 can be expressed as a function of the target quality level $\lambda_n$:

$$\text{drop percentage} = g\left(2 - \lambda_n^{\log_{10} 2}\right), \{g \in R: 0 \le g \le 50\} \quad (2)$$

where g is a scalar quantity that can be used to adjust the balance between the quality level $\lambda_n$ and the number of tensor channels used to compress the image to that quality level $\lambda_n$.

As shown in Equation 1, the loss function assumes a trade-off between the maximum achievable image quality and the progressiveness of the encoding (such as the difference between the minimum and maximum rate and distortion that can be achieved using different fractions of the total tensor). The scalar quantity g may alter the balance of this trade-off. For example, if g=50, then as $\lambda_n$ approaches 0 the percentage of dropped channels tends toward 100%. In other words, the tensor encoding component 216 can drop almost all of the channels of the prioritized tensor 203 to achieve the lowest image quality. On the other hand, if g=25, then as $\lambda_n$ approaches 0 the percentage of dropped channels tends toward 50%. In other words, the tensor encoding component 216 can drop only half of the channels of the prioritized tensor 203 to achieve the lowest image quality.

The image decoder 220 is shown to include a tensor decoding component 222, an inverse prioritization transform 224, and a synthesis transform 226. The tensor decoding component 222 is configured to decode the encoded image data 205 to recover a decoded tensor 206. In some implementations, the tensor decoding component 222 may reverse the encoding performed by the tensor encoding component 216. For example, the tensor decoding component 222 may decode the encoded image data 205 based on the same coding scheme(s) implemented by the tensor encoding component 216. In some implementations, the tensor decoding component 222 may recover the decoded tensor 206 using side information (included with the encoded image data 205) indicating an entropy model used by the tensor encoding component 216 for encoding the prioritized tensor 203. As a result, the decoded tensor 206 may be the same as the prioritized tensor 203.

The inverse prioritization transform 224 is configured to transform the channels of the decoded tensor 206 to produce a tensor 207 suitable for decoding by the synthesis transform 226. In some implementations, the channels of the tensor 207 may be the same as, or a subset of, the channels of the tensor 202. In such implementations, the inverse prioritization transform 224 may reverse the transformations performed by the prioritization transform 214. For example, the inverse prioritization transform 224 may rearrange and/or modify the channels of the decoded tensor 206 so that the information in each channel of the tensor 207 matches the information in a respective channel of the tensor 202 and the order of the channels in the tensor 207 matches the order of the same channels in the tensor 202.

The synthesis transform 226 transforms the tensor 207 into the reconstructed image data 209 based on a neural network model 208. In some implementations, the synthesis transform 226 may reverse the compression performed by the analysis transform 212. For example, the neural network model 208 may perform a decoding operation associated with the autoencoder implemented by the analysis transform 212. Thus, the neural network model 208 also may be referred to as the "generative model" of the autoencoder. As a result, the reconstructed image data 209 may be substantially similar, if not identical, to the raw image data 201.

In some implementations, the synthesis transform 226 may include multiple layers of a CNN trained to up-sample the tensor 207. For example, the CNN may produce the reconstructed image data 209 as a result of processing the tensor 207 through various convolutional layers, pooling layers, or any combination thereof, that increases the dimensionality of the tensor 207. Thus, the reconstructed image data 209 is a decompressed representation of the tensor 207. In some implementations, the reconstructed image data 209 may be represented by a 3D array of pixel values having a particular height ($h_o$), width ($w_o$), and depth ($d_o$), where $h_o>h$, $w_o>w$, and $d_o<d$. In some aspects, the reconstructed image data 209 may be further displayed or rendered as a digital image on an electronic display (not shown for simplicity).

In some aspects, the inverse prioritization transform 224 also may implement at least part of the generative model 208. For example, the transformation of the tensor channels may be performed by one or more layers of the generative model 208. In some implementations, the generative model 208 may include two or more densely connected layers that are trained to reverse the transformations performed by the densely connected layers of the inference model 204. For example, the dense layers may be connected to the input layers of the synthesis transform 226 so that the outputs of the dense layers coincide with the inputs of the synthesis transform 226 and the outputs of the dense layers result in the tensor 207.

In some aspects, the analysis transform 212, the prioritization transform 214, the inverse prioritization transform 224, and the synthesis transform 226 may be collectively trained as an autoencoder that reproduces, at its output, the same image received at its input. In such aspects, the inverse prioritization transform 224 may not directly reverse the prioritization performed by the prioritization transform 214, and the synthesis transform 226 may not directly reverse the compression performed by the analysis transform 212. In other words, the channels of the tensor 207 may be different than the channels of the tensor 202.

However, unlike existing autoencoders, the autoencoder of the present implementations is trained to prioritize tensor channels by order of importance to the reconstruction of the image. Due to progressive encoding, the tensor 207 received as input to the synthesis transform 226 may be different than the tensor 202 produced at the output of the analysis transform 212. For example, the tensor 207 may include only a subset of the channels of the tensor 202 due to bandwidth limitations of the communication channel. Thus, the quality of the reconstructed image data 209 may depend on the number of tensor channels dropped by the tensor encoding component 216.

Figure 3:
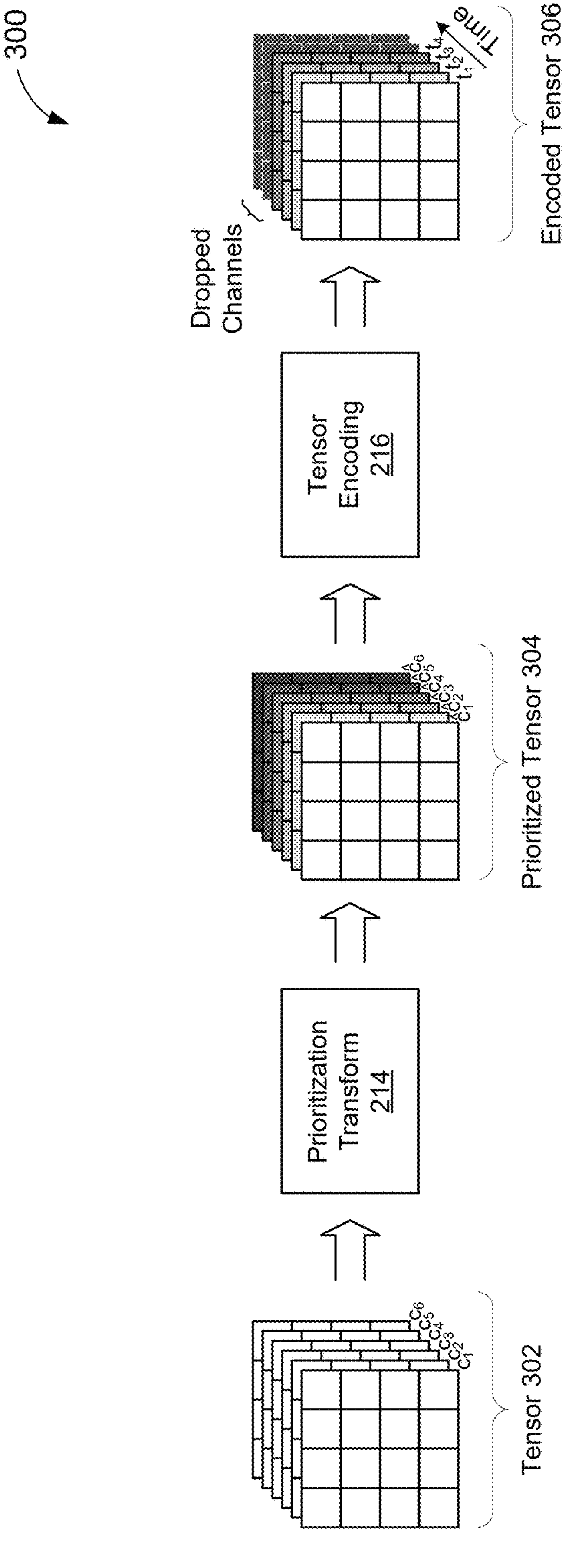
FIG. 3 shows an example operation for progressively encoding image data, according to some implementations.

FIG. 3 shows an example operation 300 for progressively encoding image data, according to some implementations. The operation 300 may be performed by an image encoder (such as the image encoder 210 of FIG. 2) to encode a tensor of latent attributes 302, as an encoded tensor 306, for transmission over a communication channel. In some implementations, the tensor 302 and the encoded tensor 306 may be examples of the tensor 202 and the encoded image data 205, respectively, of FIG. 2.

In the example of FIG. 3, the tensor 302 is depicted as a 3D tensor (h, w, d) having height h=4, width w=4, and depth d=6, where each of the channels has a respective channel index $c_i$ for $i \in \{1, 2, 3, 4, 5, 6\}$. As shown in FIG. 3, the tensor channels $c_1$-$c_6$ are arranged in order of their channel indices $c_i$ so that the first tensor channel $c_1$ is positioned at the "front" of the tensor 302 and the sixth tensor channel $c_6$ is positioned at the "back" of the tensor 302. As described with reference to FIG. 2, information contained in some of the tensor channels (such as some of the information in channel $c_4$) may contribute more heavily to the reconstruction of an image than information contained in some other tensor channels (such as some of the information in channel $c_3$).

The prioritization transform 214 recombines the tensor channels $c_1$-$c_6$ to produce prioritized channels $\hat{c}_1$-$\hat{c}_6$ representing a prioritized tensor 304. More specifically, the prioritization transform 214 arranges the prioritized channels $\hat{c}_1$-$\hat{c}_6$ based on how heavily each channel contributes to image reconstruction. In the example of FIG. 3, the prioritized tensor 304 is shown to have the same number of channels as the tensor 302. However, in actual implementations, the tensor 302 and the prioritized tensor 304 may have different numbers of channels. In some implementations, each channel of the prioritized tensor 304 may be the same as a respective channel of the tensor 302. In some other implementations, one or more channels of the prioritized tensor 304 may be different than any channel of the tensor 302 (such as described with reference to FIG. 2). In some implementations, the prioritized tensor 304 may be one example of the prioritized tensor 203 of FIG. 2. As shown in FIG. 3, the channel priorities are depicted by a color gradient such that lighter-colored channels have higher priorities than darker-colored channels.

The tensor encoding component 216 progressively encodes and transmits the prioritized tensor 304, as the encoded tensor 306, for transmission over a communication channel. More specifically, the tensor encoding component 216 encodes each channel of the prioritized tensor 304, in order of priority (such as from front to back), beginning with the highest-priority channel $\hat{c}_1$. As shown in FIG. 3, the tensor encoding component 216 transmits the encoded first channel of the prioritized tensor 304 at time $t_1$, followed by the encoded second channel of the prioritized tensor 304 at time $t_2$, followed by the encoded third channel of the prioritized tensor 304 at time $t_3$, followed by the encoded fourth channel of the prioritized tensor 304 at time $t_4$. In the example of FIG. 3, the tensor encoding component 216 terminates the transmission of the prioritized tensor 304 without transmitting and/or encoding the remaining lower-priority channels $\hat{c}_5$ and $\hat{c}_6$.

In some implementations, the tensor encoding component 216 may terminate the transmission and/or encoding of the prioritized tensor 304 when the size of the encoded tensor 306 reaches or exceeds a bandwidth limit of the communication channel. In some other implementations, the tensor encoding component 216 may terminate the transmission and/or encoding of the prioritized tensor 304 when the size of the encoded tensor 306 is sufficient to reconstruct the image at a target quality level. As a result of terminating the transmission early, the last two channels $\hat{c}_5$ and $\hat{c}_6$ of the prioritized tensor 304 (representing the lowest priority channels) are effectively "dropped" from encoded tensor 306. Thus, an image decoder (such as the image decoder 220 of FIG. 2) must recover the original image using only a subset of the channels of the prioritized tensor 304 (such as the prioritized channels $\hat{c}_1$-$\hat{c}_4$).

Figure 4:
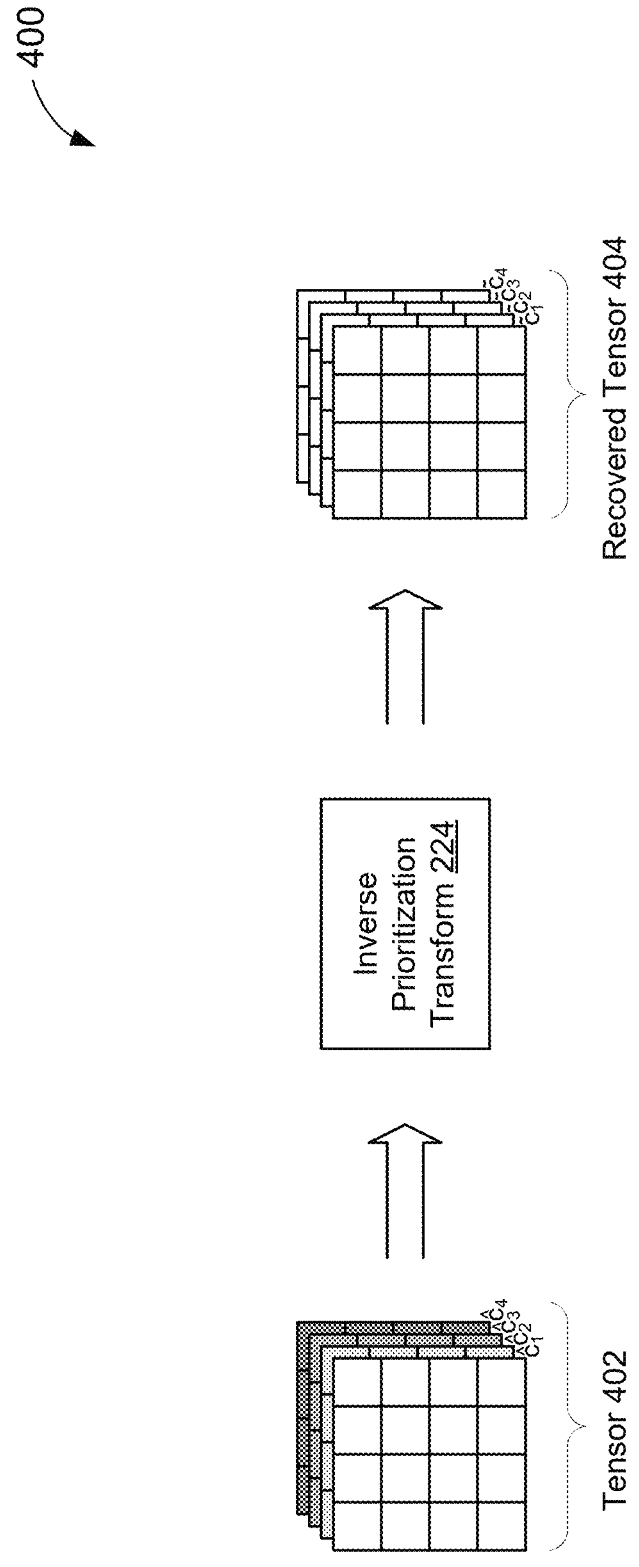
FIG. 4 shows an example operation for decoding progressively coded image data, according to some implementations.

FIG. 4 shows an example operation 400 for decoding progressively coded image data, according to some implementations. The operation 400 may be performed by an image decoder (such as the image decoder 220 of FIG. 2) to transform the channels of a tensor 402, as a recovered tensor 404, for input to a synthesis transform (such as the synthesis transform 226 of FIG. 2). In some implementations, the tensor 402 and the recovered tensor 404 may be examples of the decoded tensor 206 and the tensor 207, respectively, of FIG. 2.

In the example of FIG. 4, the tensor 402 is depicted as a 3D tensor (h, w, d) having height h=4, width w=4, and depth d=4, where each of the channels has a respective channel index $\hat{c}_i$ for $i \in \{1, 2, 3, 4\}$. In some implementations, the tensor 402 may be a decoded representation of the encoded tensor 306 of FIG. 3. Thus, the channels $\hat{c}_1$-$\hat{c}_4$ of the tensor 402 represent a limited subset of the channels $\hat{c}_1$-$\hat{c}_6$ of the prioritized tensor 304. As shown in FIG. 4, the tensor channel $\hat{c}_1$ (having the highest priority) is positioned at the front of the tensor 402, followed by the tensor channel $\hat{c}_2$ (having the second-highest priority), followed by the tensor channel $\hat{c}_3$ (having the third-highest priority), followed by the tensor channel $\hat{c}_4$ (having the fourth-highest priority) which is positioned at the back of the tensor 402.

The inverse prioritization transform 224 transforms the tensor channels $\hat{c}_1$-$\hat{c}_4$ into tensor channels $\bar{c}_1$-$\bar{c}_4$, representing a recovered tensor 404, that can be decompressed by a synthesis transform (such as the synthesis transform 226 of FIG. 2) to reconstruct an image. In the example of FIG. 4, the recovered tensor 404 is shown to have the same number of channels as the tensor 402. However, in actual implementations, the tensor 402 and the recovered tensor 404 may have different numbers of channels. In some implementations, the tensor channels $\bar{c}_1$-$\bar{c}_4$ may be a subset of the channels $c_1$-$c_6$ of the tensor 302 (such as where the inverse prioritization transform 224 is trained to reverse the prioritization performed by the prioritization transform 214). In some other implementations, one or more of the tensor channels $\bar{c}_1$-$\bar{c}_4$ may be different than any of the channels $c_1$-$c_6$ of the tensor 302 (such as where the analysis transform 212, the prioritization transform 214, the inverse prioritization transform 224, and the synthesis transform 226 are collectively trained as an autoencoder).

Figure 5:
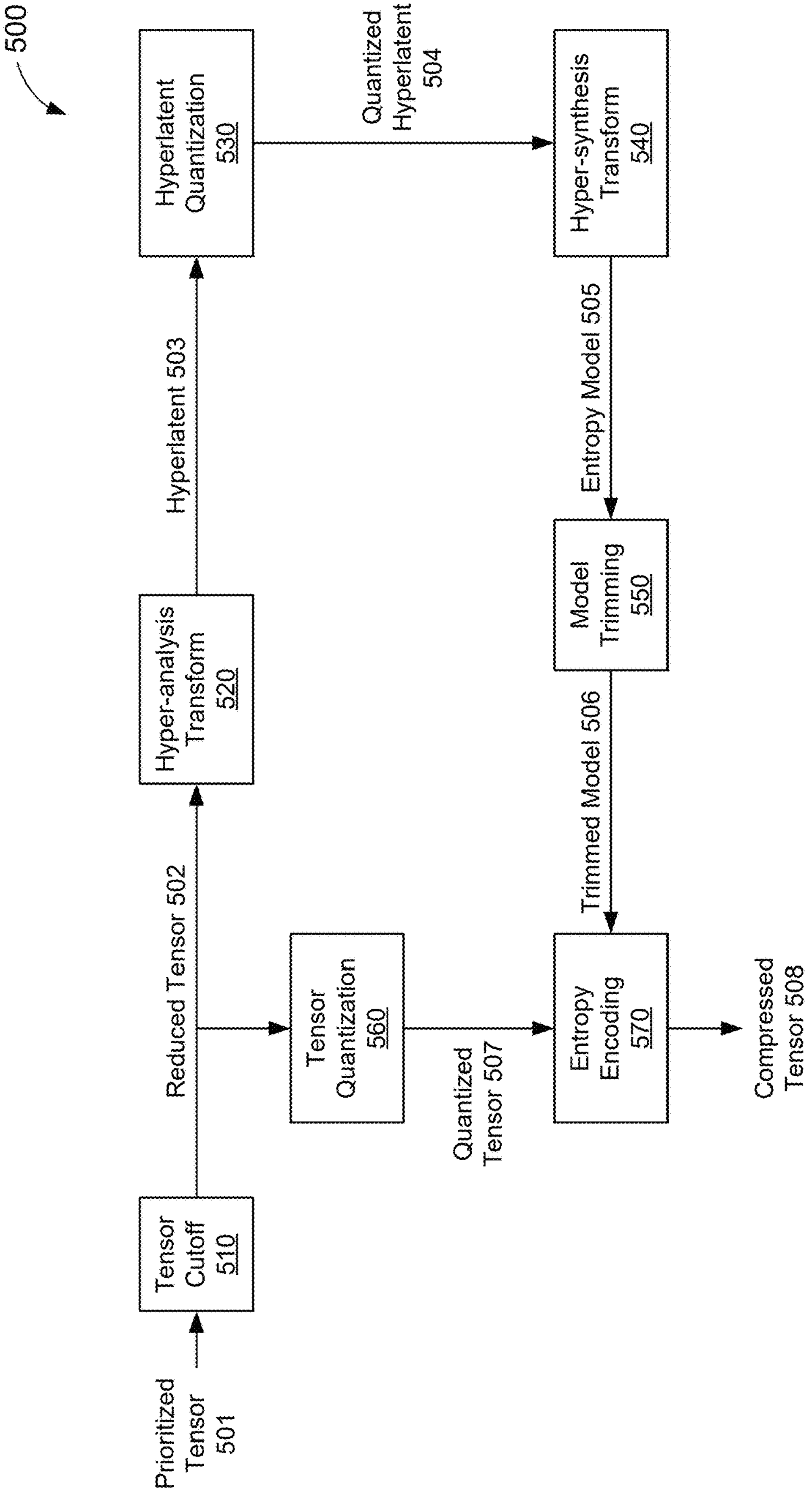
FIG. 5 shows a block diagram of an example entropy encoding system, according to some implementations.

FIG. 5 shows a block diagram of an example entropy encoding system 500, according to some implementations. In some implementations, the entropy encoding system 500 may be one example of the tensor encoding component 216 of FIG. 2. More specifically, the entropy coding system 500 is configured to perform an entropy encoding operation on a prioritized tensor 501 to produce a compressed tensor 508. With reference to FIG. 2, the prioritized tensor 501 may be one example of the prioritized tensor 203 and the compressed tensor 508 may be one example of the encoded image data 205.

The entropy encoding system 500 includes a tensor cutoff component 510, a hyper-analysis transform 520, a hyperlatent quantization component 530, a hyper-synthesis transform 540, a model trimming component 550, a tensor quantization component 560, and an entropy encoding component 570. The tensor cutoff component 510 is configured to produce a reduced tensor 502 by dropping one or more channels from the prioritized tensor 501 (such as described with reference to FIGS. 2 and 3). In some implementations, the tensor cutoff component 510 may drop channels from the prioritized tensor 501 based on bandwidth limitations of a communication channel. In some other implementations, the tensor cutoff component 510 may drop channels from the prioritized tensor 501 based on a target or desired quality level of the reconstructed image.

The tensor quantization component 560 quantizes the reduced tensor 502 as a quantized tensor 507. The elements of the quantized tensor 507 have spatial dependencies which can be modeled by latent variables conditioned on the assumption that such elements are independent. More specifically, elements of the quantized tensor 507 can be modeled as zero-mean Gaussians with spatially varying standard deviations. The hyper-analysis transform 520 summarizes a distribution of standard deviations 503 of the reduced tensor 502 based on a parametric transform. In some aspects, the parametric transform may be a neural network composed of convolutional layers and rectified linear units (ReLUs) trained to infer a latent representation of an entropy model. Thus, the distribution of standard deviations 503 is also referred to as a "hyperlatent."

The hyperlatent quantization component 530 quantizes the hyperlatent 503 as a quantized hyperlatent 504. The hyper-synthesis transform 540 estimates a spatial distribution of the standard deviations 505 of the quantized tensor 507 (also referred to as the "entropy model") by applying another parametric transform to the quantized hyperlatent 504. In some implementations, the hyper-analysis transform 520 and the hyper-synthesis transform 540 may be trained in conjunction with an autoencoder used for compressing and decompressing image data associated with the prioritized tensor 501 (such as the analysis transform 212 and the synthesis transform 226 of FIG. 2). As a result, one or more channels of the entropy model 505 may be associated with channels that were dropped from the prioritized tensor 501 (such as by the tensor cutoff component 510).

In some implementations, the model trimming component 550 may further drop one or more channels of the entropy model 505 to produce a trimmed model 506 that more accurately reflects the spatial distribution of the standard deviations. For example, the dropped channels from the entropy model 505 may be associated with the dropped channels from the prioritized tensor 501. The entropy encoding component 570 uses the trimmed model 506 to encode the quantized tensor 507 as the compressed tensor 508. For example, the entropy encoding component 570 may derive probability estimates for encoded values of the compressed tensor 508 based on the trimmed model 506. The compressed tensor 508 may be transmitted to an entropy decoder (such as the tensor decoding component 222 of FIG. 2). In some aspects, the quantized hyperlatent 504 also may be encoded and/or transmitted, as side information, to the entropy decoder.

Figure 6:
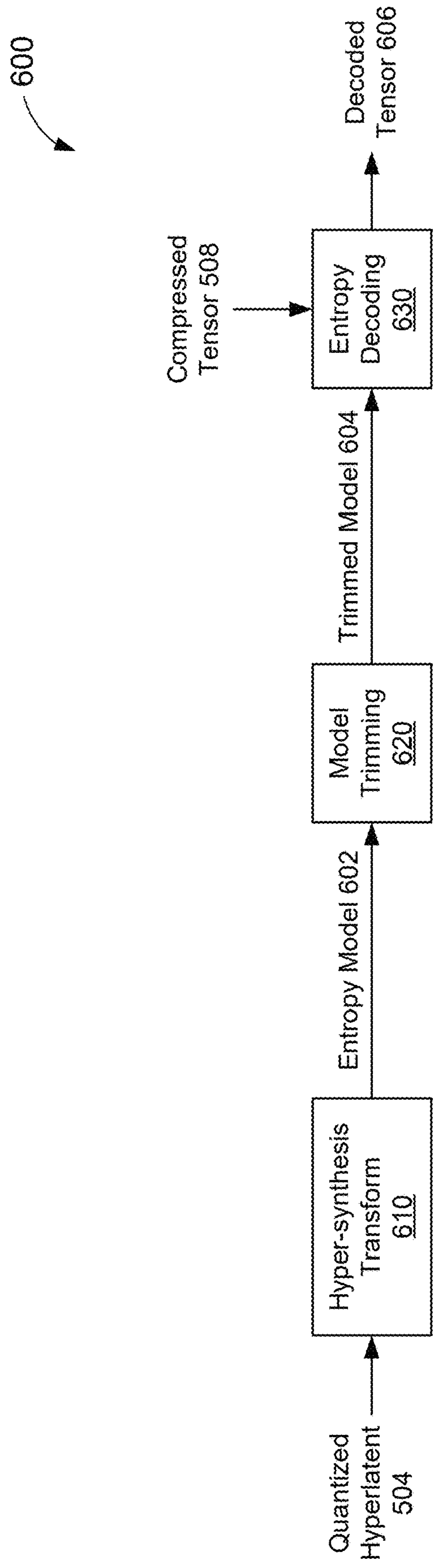
FIG. 6 shows a block diagram of an example entropy decoding system, according to some implementations.

FIG. 6 shows a block diagram of an example entropy decoding system 600, according to some implementations. In some implementations, the entropy decoding system 600 may be one example of the tensor decoding component 222 of FIG. 2. More specifically, the entropy decoding system 600 uses the quantized hyperlatent 504 of FIG. 5 in performing an entropy decoding operation on the compressed tensor 508 to recover a decoded tensor 606. With reference to FIG. 2, the quantized hyperlatent 504 and the compressed tensor 508 may be examples of the encoded image data 205 and the decoded tensor 606 may be one example of the decoded tensor 206.

The entropy decoding system 600 includes a hyper-synthesis transform 610, a model trimming component 620, and an entropy decoding component 630. The hyper-synthesis transform 610 estimates an entropy model 602 based on the quantized hyperlatent 504. In some implementations, the hyper-synthesis transform 610 may be the same as the hyper-synthesis transform 540 of FIG. 5. For example, the hyper-synthesis transform 610 may recover the entropy model 602 by applying a parametric transform (such as a neural network composed of convolutional layers and ReLUs) to the quantized hyperlatent 504. Thus, the entropy model 602 may be one example of the entropy model 505 of FIG. 5. With reference for example to FIG. 5, the entropy model 602 may indicate a spatial distribution of the standard deviations of the quantized tensor 507.

As described with reference to FIG. 5, one or more channels of the entropy model 602 may be associated with channels that were dropped from the compressed tensor 508 (such as by the tensor cutoff component 510). Thus, the model trimming component 620 is configured to drop one or more channels of the entropy model 602 to produce a trimmed model 604 that more accurately reflects the spatial distribution of the standard deviations. In some implementations, the model trimming component 620 may be the same as the model trimming component 550 of FIG. 5. With reference for example to FIG. 5, the dropped channels from the entropy model 602 may be associated with the dropped channels from the prioritized tensor 501.

The entropy decoding component 630 uses the trimmed model 604 to recover the decoded tensor 606 from the compressed tensor 508. In some implementations, the entropy decoding component 630 may decode the compressed tensor 508 using the same entropy model as the entropy encoding component 570. For example, the entropy decoding component 630 may derive probability estimates for encoded values of the compressed tensor 508 based on the trimmed model 604. In some aspects, the decoded tensor 606 may be further processed and/or decompressed (such as by the inverse prioritization transform 224 and the synthesis transform 226 of FIG. 2) to recover reconstructed image data (not shown for simplicity).

Figure 7:
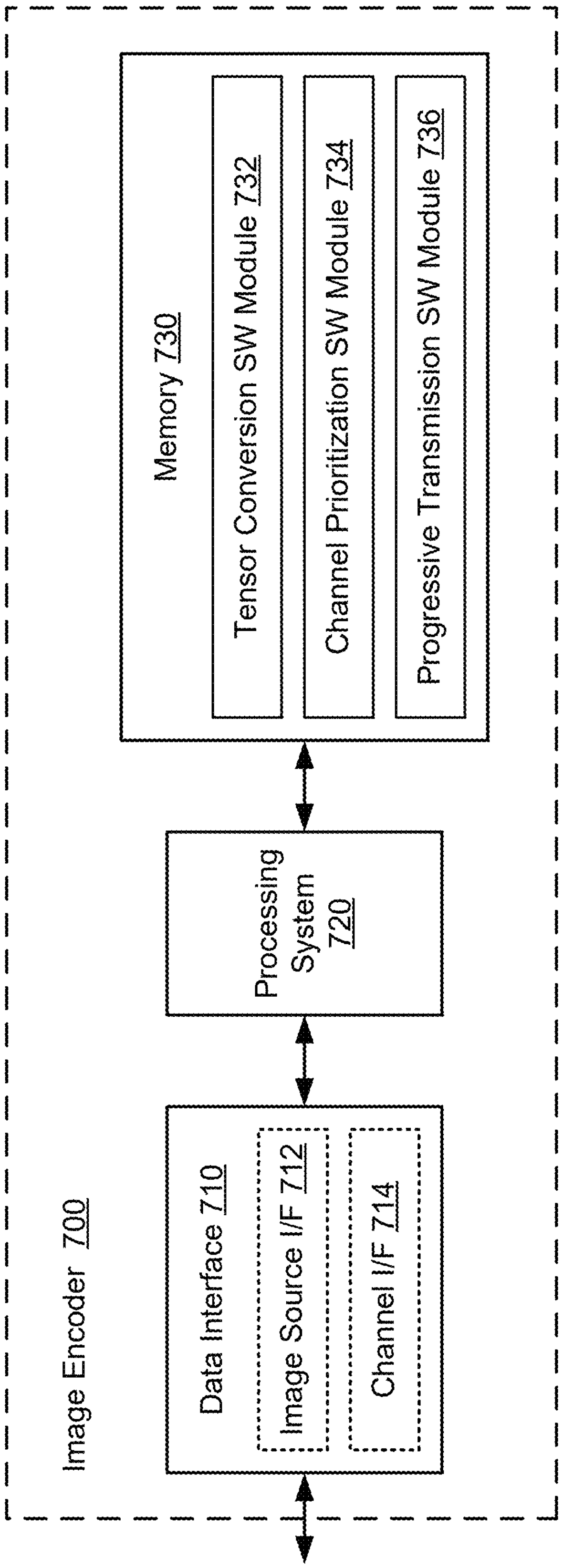
FIG. 7 shows a block diagram of an example image encoder, according to some implementations.

FIG. 7 shows a block diagram of an example image encoder 700, according to some implementations. In some implementations, the image encoder 700 may be one example of the image encoder 210 of FIG. 2. More specifically, the image encoder 700 may be configured to encode image data for transmission over a communication channel.

In some implementations, the image encoder 700 may include a data interface 710, a processing system 720, and a memory 730. The data interface 710 is configured to receive image data from an image source and output, over the communication channel, a compressed representation of the image data. In some aspects, the data interface 710 may include an image source interface (I/F) 712 to communicate with the image source and a channel interface 714 to communicate via the communication channel.

The memory 730 may include a non-transitory computer-readable medium (including one or more nonvolatile memory elements, such as EPROM, EEPROM, Flash memory, a hard drive, and the like) that may store at least the following software (SW) modules:

- a tensor conversion SW module 732 to encode an image as a tensor of latent attributes having a plurality of first channels based on one or more first layers of a neural network model;
- a channel prioritization SW module 734 to recombine the plurality of first channels, as a plurality of second channels having a prioritized order, based on one or more second layers of the neural network model; and
- a progressive transmission SW module 736 to progressively transmit the plurality of second channels over the communication channel based on the prioritized order.

Each software module includes instructions that, when executed by the processing system 720, causes the image encoder 700 to perform the corresponding functions.

The processing system 720 may include any suitable one or more processors capable of executing scripts or instructions of one or more software programs stored in the encoder 700 (such as in memory 730). For example, the processing system 720 may execute the tensor conversion SW module 732 to encode an image as a tensor of latent attributes having a plurality of first channels based on one or more first layers of a neural network model. The processing system 720 also may execute the channel prioritization SW module 734 to recombine the plurality of first channels, as a plurality of second channels having a prioritized order, based on one or more second layers of the neural network model. The processing system 700 may further execute the progressive transmission SW module 736 to progressively transmit the plurality of second channels over the communication channel based on the prioritized order.

Figure 8:
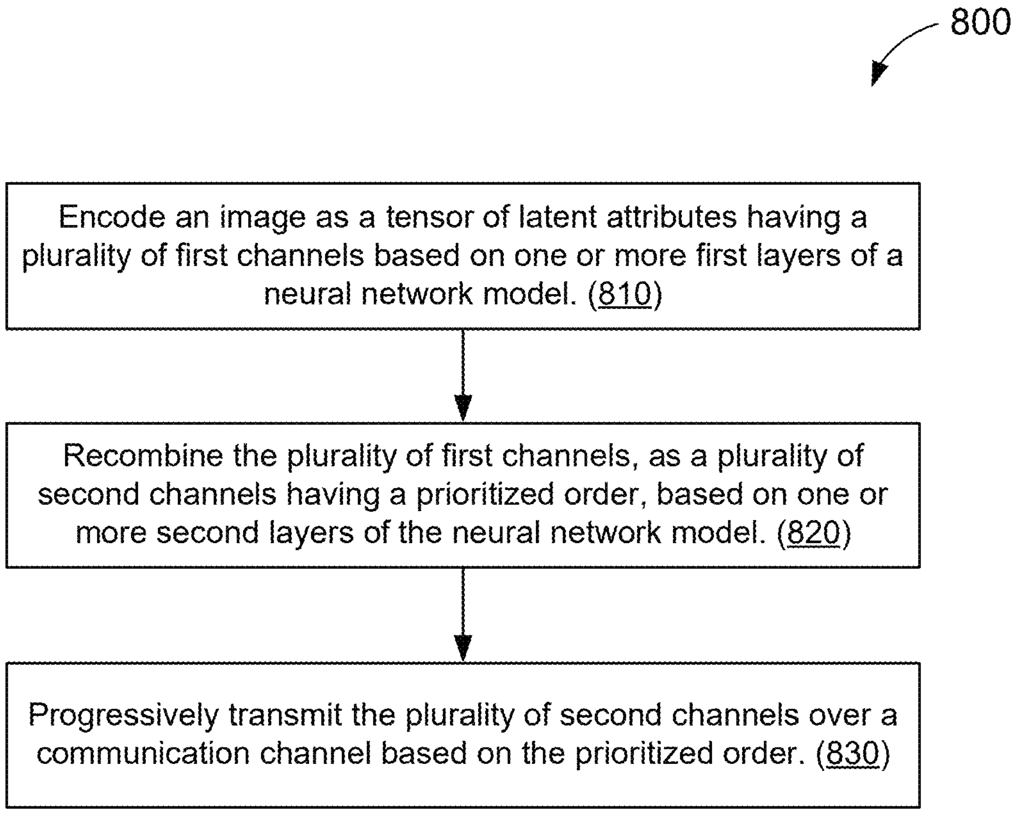
FIG. 8 shows an illustrative flowchart depicting an example operation for encoding image data, according to some implementations.

FIG. 8 shows an illustrative flowchart depicting an example operation 800 for encoding image data, according to some implementations. In some implementations, the operation 800 may be performed by an image encoder such as any of the image encoders 210 or 700 of FIGS. 2 and 7, respectively.

The image encoder encodes an image as a tensor of latent attributes having a plurality of first channels based on one or more first layers of a neural network model (810). In some implementations, the one or more first layers of the neural network model may be trained to perform an encoding operation associated with an autoencoder. The image encoder recombines the plurality of first channels, as a plurality of second channels having a prioritized order, based on one or more second layers of the neural network model (820). The image encoder progressively transmits the plurality of second channels over a communication channel based on the prioritized order (830).

In some aspects, the one or more second layers of the neural network model may be trained to assign a priority to each channel of the plurality of second channels based on a contribution of the channel to a quality level of the image. In some implementations, the progressive transmission of the plurality of second channels may include transmitting each channel of the plurality of second channels, in order of the assigned priorities, so that the channel assigned the highest priority is transmitted before the channel assigned the lowest priority. In some implementations, the progressive transmission of the plurality of second channels may further include terminating the transmission of the plurality of second channels prior to transmitting one or more channels of the plurality of second channels over the communication channel. In some implementations, the transmission may be terminated based at least in part on a bandwidth of the communication channel.

In some aspects, the progressive transmission of the plurality of second channels may include generating a hyperlatent based on a subset of channels of the plurality of second channels, determining an entropy model based on the hyperlatent, and encoding each channel in the subset of channels based on the entropy model prior to transmitting the channel over the communication channel. In some implementations, the hyperlatent may be a latent representation of the entropy model. In some implementations, the image encoder may further discard one or more channels of the entropy model prior to encoding the subset of channels. In some implementations, the subset of channels may exclude one or more channels, of the plurality of second channels, that are not transmitted over the communication channel. In some implementations, the image encoder may further transmit the hyperlatent over the communication channel.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for encoding images, comprising:

encoding an image as a tensor of latent attributes having a plurality of first channels based on one or more first layers of a neural network model;

recombining the plurality of first channels, as a plurality of second channels having a prioritized order, based on one or more second layers of the neural network model, the one or more second layers trained to assign a priority to each channel of the plurality of second channels based on a contribution of the channel to at least one quality level of a plurality of quality levels of the image, wherein the one or more second layers are trained based at least in part on minimizing a loss function over the plurality of quality levels; and progressively transmitting the plurality of second channels over a communication channel based on the prioritized order.

2. The method of claim 1, wherein the one or more first layers of the neural network model are trained to perform an encoding operation associated with an autoencoder.

3. The method of claim 1, wherein the progressive transmission of the plurality of second channels comprises:

transmitting each channel of the plurality of second channels, in order of the assigned priorities, so that the channel assigned the highest priority is transmitted before the channel assigned the lowest priority.

4. The method of claim 3, wherein the progressive transmission of the plurality of second channels further comprises:

terminating the transmission of the plurality of second channels prior to transmitting one or more channels of the plurality of second channels over the communication channel.

5. The method of claim 4, wherein the transmission is terminated based at least in part on a bandwidth of the communication channel.

6. The method of claim 1, wherein the progressive transmission of the plurality of second channels comprises:

generating a hyperlatent based on a subset of channels of the plurality of second channels;

determining an entropy model based on the hyperlatent; and encoding each channel in the subset of channels based on the entropy model prior to transmitting the channel over the communication channel.

7. The method of claim 6, wherein the hyperlatent is a latent representation of the entropy model.

8. The method of claim 6, further comprising:

discarding one or more channels of the entropy model prior to encoding the subset of channels.

9. The method of claim 6, wherein the subset of channels excludes one or more channels, of the plurality of second channels, that are not transmitted over the communication channel.

10. The method of claim 6, further comprising:

transmitting the hyperlatent over the communication channel.

11. An encoder comprising:

a processing system; and a memory storing instructions that, when executed by the processing system, causes the encoder to:

encode an image as a tensor of latent attributes having a plurality of first channels based on one or more first layers of a neural network model;

recombine the plurality of first channels, as a plurality of second channels having a prioritized order, based on one or more second layers of the neural network model, the one or more second layers trained to assign a priority to each channel of the plurality of second channels based on a contribution of the channel to a to at least one quality level of a plurality of quality levels of the image, wherein the one or more second layers are trained based in part on minimizing a loss function over the plurality of quality levels; and progressively transmit the plurality of second channels over a communication channel based on the prioritized order.

12. The encoder of claim 11, wherein the one or more first layers of the neural network model are trained to perform an encoding operation associated with an autoencoder.

13. The encoder of claim 11, wherein the progressive transmission of the plurality of second channels comprises:

transmitting each channel of the plurality of second channels, in order of the assigned priorities, so that the channel assigned the highest priority is transmitted before the channel assigned the lowest priority.

14. The encoder of claim 13, wherein the progressive transmission of the plurality of second channels further comprises:

terminating the transmission of the plurality of second channels prior to transmitting one or more channels of the plurality of second channels over the communication channel.

15. The encoder of claim 14, wherein the transmission is terminated based at least in part on a bandwidth of the communication channel.

16. The encoder of claim 11, wherein the progressive transmission of the plurality of second channels comprises:

generating a hyperlatent based on a subset of channels of the plurality of second channels;

determining an entropy model based on the hyperlatent; and encoding each channel in the subset of channels based on the entropy model prior to transmitting the channel over the communication channel.

17. The encoder of claim 16, wherein execution of the instructions further causes the encoder to:

discard one or more channels of the entropy model prior to encoding the subset of channels.

18. The encoder of claim 16, wherein the subset of channels excludes one or more channels, of the plurality of second channels, that are not transmitted over the communication channel.

* * * * *